United States Patent [19]

Dansdill

[11] Patent Number: 4,995,735
[45] Date of Patent: Feb. 26, 1991

[54] CONTOURED JOURNAL BEARING

[76] Inventor: Terence J. Dansdill, 12 Wilson St., Beverly, Mass. 01915

[21] Appl. No.: 288,745

[22] Filed: Dec. 22, 1988

[51] Int. Cl.⁵ .................... F16C 23/02; F16C 17/02
[52] U.S. Cl. .................................... 384/276; 384/192
[58] Field of Search ............ 384/286, 192, 205, 202, 384/276, 302, 416–419

[56] References Cited

U.S. PATENT DOCUMENTS 4,336,006  6/1982  Grabow et al. ............... 384/192 X
4,605,363  8/1986  Walsh ............................ 384/192 X

FOREIGN PATENT DOCUMENTS 72238    7/1943  Czechoslovakia ................ 384/202
426999   8/1926  Fed. Rep. of Germany ...... 384/192
800353  10/1950  Fed. Rep. of Germany ...... 384/192
989640   9/1951  France ............................ 384/192
1380947  1/1975  United Kingdom .............. 384/286

Primary Examiner—Thomas R. Hannon

[57] ABSTRACT

An improved journal bearing for use in lubricated gear trains under loads sufficient to bend the rotor of the gear which is rotatably supported in the bearing is provided which utilizes a contoured babbitt lining between the bearing shell and rotor, a portion of the babbitt being contoured in a direction along the axis of the rotor to substantially conform to the contour of the rotor under load with the slope and length of the contour being adequate to maintain an acceptable minimum lubrication film thickness of the bearing with the rotor over the load profile of the rotor.

9 Claims, 3 Drawing Sheets

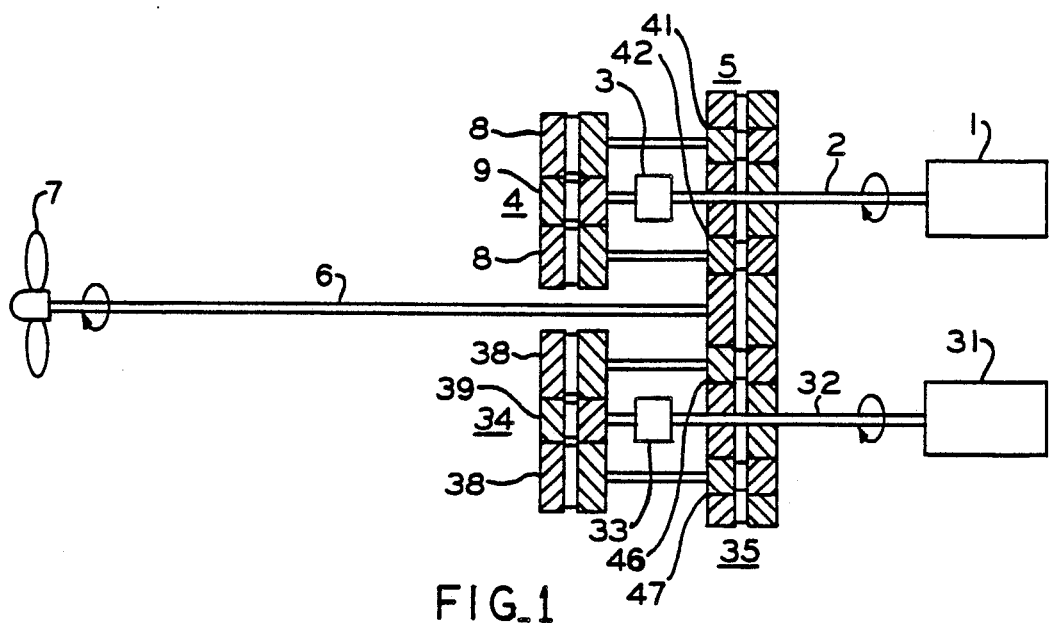
FIG_1
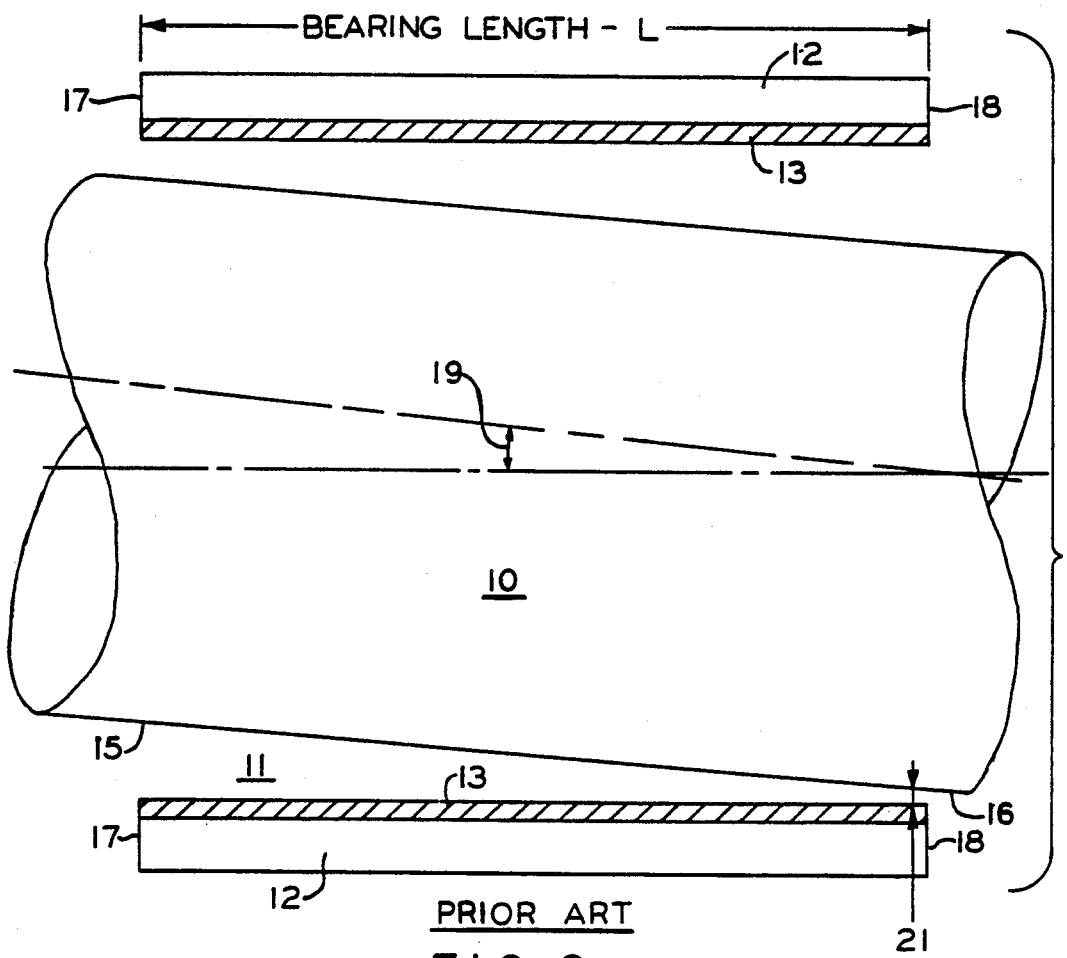
PRIOR ART
FIG_2

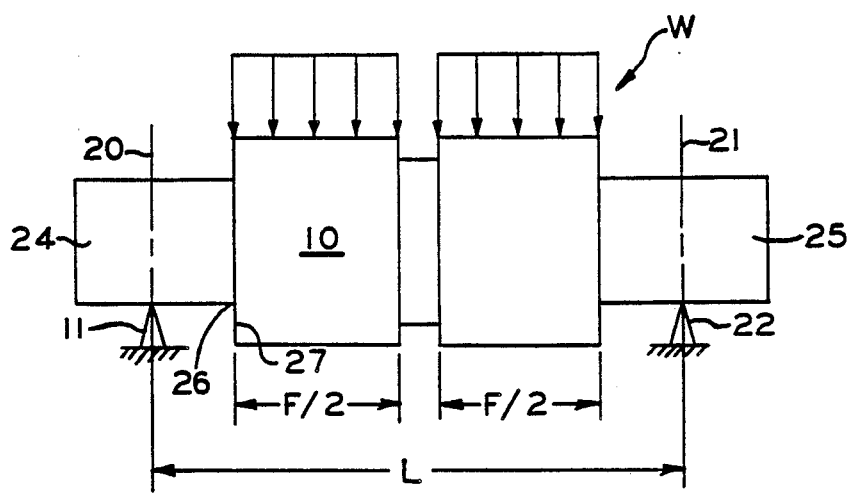
FIG_3
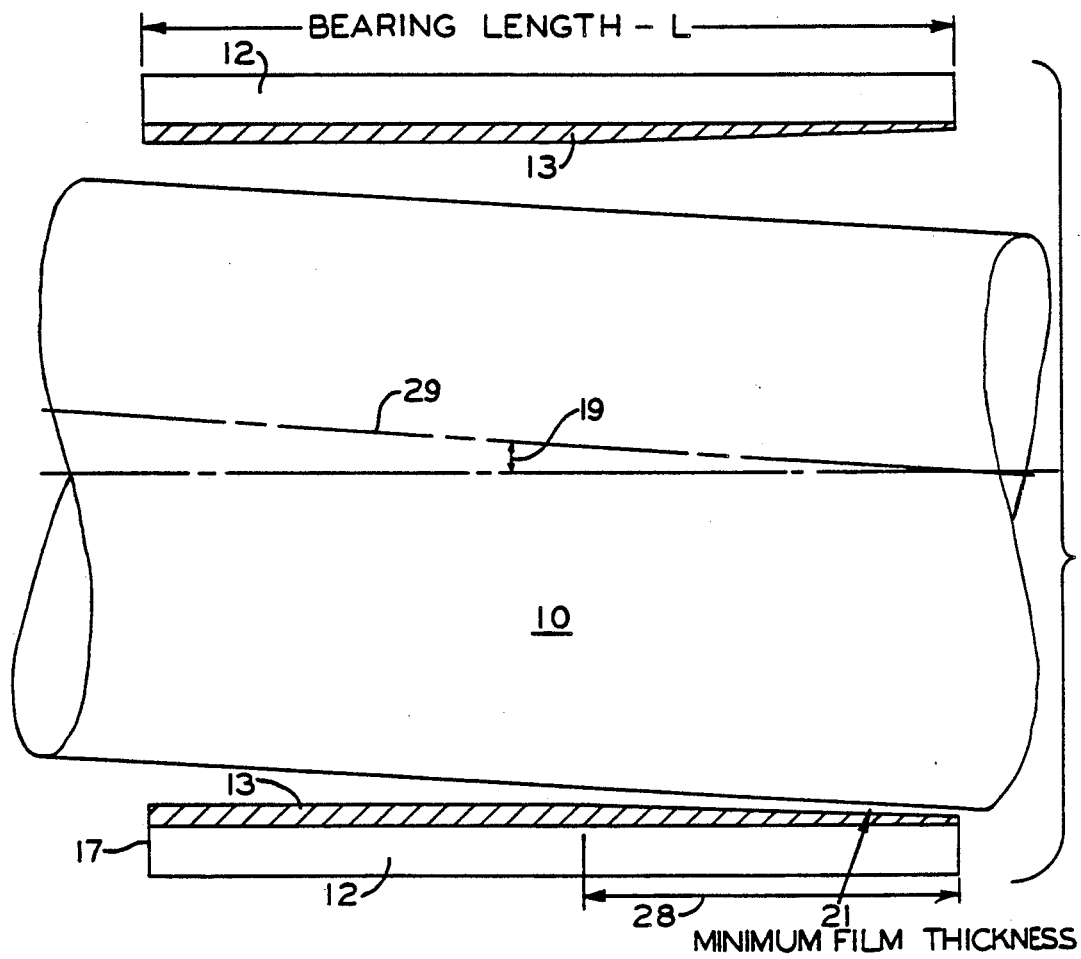
FIG_4

| EXAMPLE | STRAIGHT BORED BEARING 1 | COUTOUR BORED BEARING | |
|---|---|---|---|
| | | 2 | 3 |
| JOURNAL SPEED (RPM) | 1000 | 1000 | 1000 |
| JOURNAL LOAD (LBS) | 50000 | 50000 | 50000 |
| JOURNAL DIA (IN) | 12.00 | 12.00 | 12.00 |
| JOURNAL LENGTH (IN) | 10.00 | 10.00 | 10.00 |
| CONTOUR SLOPE (IN/IN) | 0.000 | 0.004 | 0.004 |
| CONTOUR LENGTH (IN) | 0.00 | 6.00 | 10.00 |
| BEARING DIAMETRAL CLEARANCE (IN) | 0.012 | 0.012 | 0.012 |
| ROTOR JOURNAL SLOPE (IN/IN) | 0.004 | 0.004 | 0.004 |
| MINIMUM FILM THICKNESS (MILS) | 0.115 | 1.223 | 1.282 |
| ROTOR JOURNAL SLOPE (IN/IN) | 0.000 | 0.000 | 0.000 |
| MINIMUM FILM THICKNESS (MILS) | 1.579 | 1.036 | 0.070 |

FIG. 5

CONTOURED JOURNAL BEARING

BACKGROUND OF THE INVENTION

The present invention relates to an improved bearing design and more particularly to contouring the bearing surface to compensate for bending of the rotor under heavy loads.

Many industrial and marine, or shipboard, gearing applications require designs which are light weight and reduced in size even though the power transmitted is very high. For example, marine gearing often must be reduced in size and weight to accommodate ship weight targets as well as available machinery space. While marine applications, as described below, are generally speed reducers, industrial applications are either speed reducers or speed increasers. In ship propulsion applications, the gearing is provided for speed reducing, that is to reduce the speed of the relatively high speed engine to rotate the ships' propellers at much lower speeds. Such applications typically transmit in excess of 25,000 shaft horsepower, wherein the input speed may be in the order of 3000 RPM with a reduced propeller speed of around 125 RPM. Each pinion and gear in the gear train is supported on a pair of babbitted journal bearings.

The reductions in size and weight of the gear train or gearing increases the loading density on the gearing elements, resulting in smaller rotor diameters with increased face loading as well as higher bearing operating pressures. Contact stresses in the order of 70,000 PSI (pounds per square inch) and bending stress in the order of 30,000 PSI are encountered. During operation, such rotors experience increased bending deflections due to the reduced bending inertia of the cross section of the rotor and higher loading on the gear face. The larger bending deflections over the length of the journal bearings result in reduced operating oil film thicknesses at the edge of the bearing closest to the rotor face.

One method of accommodating the resultant rotor slope across the bearing surface and obtain adequate film thickness is to use tilting pad journal bearings which align themselves with the bending line of the rotor. However, tilting pads add to the complexity and cost of the gearing as well as higher power losses, thereby reducing the overall efficiency of the machine. Accordingly, it is desirable to accommodate for the bending deflections without the use of tilting pads.

Also, it is desirable to be able to accommodate rotor bending in a number of different types of bearings such as pressure groove bearings, three lobe bearings and elliptical bearings, which are used in reduction gears, often in the same gear set.

OBJECTS AND SUMMARY OF INVENTION

Accordingly, it is an object of the present invention to provide an improved journal bearing to accommodate rotor bending and obtain adequate oil film thickness during operation.

It is a further object of the present invention to provide an improved journal bearing contoured to accommodate rotor bending and obtain adequate oil film thickness during operation.

It is another object of the present invention to provide an improved journal bearing including a fixed arc journal to obtain adequate film thickness during operation in a number of different types of bearings.

In carrying out the above and other objects of the invention, an improved journal bearing is provided for use with gearing which is subjected to loading sufficient to bend the rotor of the gear which is rotatably supported by the bearing. The bending adversely affects the film thickness between the rotor and the babbitt within the bearing shell. In order to maintain an acceptable minimum oil film thickness over the load profile of the rotor, the bearing bore is contoured along the axis of the bearing and rotor to conform to the bending line of the rotor under load. A straight line contour of approximately one half the axial length of the bearing is suitable for many bearings over the load profile of the rotor.

BRIEF DESCRIPTION OF DRAWINGS

FIG. 1 is a simplified diagram of a reduction gear assembly in which the present invention is useful;

FIG. 2 is a diagram illustrating in somewhat exaggerated form the effects of rotor bending on a journal bearing and useful in understanding the present invention;

FIG. 3 is a drawing illustrating the load relationships in a gear element useful in understanding the present invention;

FIG. 4 illustrates a bearing bore embodying the present invention; and

FIG. 5 is a table useful in understanding the present invention.

FIG. 1 shows a simplified reduction gear assembly for marine use. Referring to FIG. 1, the ships engines 1 and 31, which may be relatively high speed gas turbines, are connected respectively through drive shafts 2 and 32, turbine clutches 3 and 33, first reduction gearing 4 and 34 and second redction gearing 5 and 35 to provide the lower speed high power output drive to the propeller 7. A similar set of engines, gearing and drives would be used for the other propeller (not shown) of the ship. The first reduction gearing 4 includes reduction gears 8 and reduction pinion 9; while reduction gearing 34 includes reduction gears 38 and reduction pinion 39. The second reduction gearing 5 includes reduction pinions 41 and 42; while the second reduction gearing 35 includes reduction pinions 46 and 47. The direction of rotation of the drive shafts 2 and 32; the gears and pinions of the reduction gearing 4 and 34, and 5 and 35; the propeller shaft 6 and the propeller 7 are shown by arrows in FIG. 1. Because of the extremely heavy loading of the reduction gearing 4, 34 and 5, 35, and the requirement in marine gearing to keep the size and weight to a minimum to meet shipboard space and weight requirements, bending occurs in the rotor shafts of the various gears and pinions of the reduction gearing. The journal bearings which support each end of the various gears and pinions are adversely affected by such bending of the rotor shafts as described in more detail in connection with FIG. 2, and as a result journal bearings of the type shown in FIG. 3 are utilized in the reduction gear assembly of FIG. 1 in accordance with the present invention.

Referring to the prior art FIG. 2, the shaft or rotor 10 of a gear such as reduction gear 8 of FIG. 1 is rotably supported at each end by bearing 11. Bearing 11 includes bearing shell 12 and babbitt 13 positioned between the bearing shell and the rotor. The babbitt metal alloy 13 greatly extends the range of service of the bearing. However, the heavy loading on the rotor 10 causes it to bend such that the portion 15 is further away from the bottom left end 17 of bearing 11 to which it is adjacent; than the portion 16 which is adjacent to the bottom right end 18 of bearing 11. That is, the rotor has bent upward at the left through the angle 19 which as shown in FIG. 2 is a somewhat exaggerated amount for purposes of illustration. As a result, the bearing surface or minimum film thickness 21 between rotor 10 and babbitt 13 at the lower right end 18 of the rotor is decreased. To overcome these adverse results, the present invention increases the minimum film thickness and provides adequate film thicknesses during operation.

The bending line of the rotor 10 is first established. The rotor 10 is modeled as a simply supported beam with a uniformly distributed load across the face as shown in FIG. 3.

Referring to FIG. 3, the rotor 10 is supported on the centerline 20 of the left bearing 11 which is shown schematically as a fulcrum, and supported on the centerline 21 of the right bearing 22 which is also shown schematically as a fulcrum. The load applied to the rotor as a result of power transmission is schematically shown as a uniformly distributed load shown by the arrows. The slope of the journal portion 24 of rotor 10 within the bearing 11 may be found be calculating the journal deflection at each end of the bearing and dividing by the bearing length. This is done by the fourth derivative of displacement commonly expressed as:

$$\frac{d^2}{dx^2}(EI\, d^2y/dx^2) = w$$

where:
  w is the distributed shear along a beam section (lb/in)
  x is the distance along a beam section (in)$_2$
  E is the beam modulus of elasticitY (lbs/in$^2$)
  y is the transverse displacement of the beam neutral axis (in)
  I is the area moment of inertia of the beam cross section with respect to a transverse axis through the neutral axis (in)

See *Strength of Materials*, Third Edition, Timoshenko, (D. Van Nostrand: New York, 1930), page 140.

The appropriate equation is written for the defined boundary conditions and changes in cross-sections. In this fashion a bending model of the rotor can be constructed and the deflections at any point along the beam obtained.

Once the slope is determined, and with known journal speed, bearing load, bearing geometry and oil characteristics the film thickness and effective center of pressure along the length of the bearing can be calculated. The oil film thickness and pressure is found by a finite difference solution of the Reynolds equation. As discussed in *Bearing Design and Application*, by Donald F. Wilcock and E. Richard Booser (McGraw-Hill: New York, 1957), page 195,:

$$\frac{\partial}{\partial x}\frac{h^3}{\mu}\frac{\partial p}{\partial x} + \frac{\partial}{\partial z}\frac{h^3}{\mu}\frac{\partial p}{\partial z} = .6U\frac{\partial h}{\partial x}$$

where:
  h oil film thickness at location z, x
  p oil film pressure at location z, x
  U journal velocity
  $\mu$ = coefficient of absolute viscosity
  x = reference coordinate system
  z = reference coordinate system Once the solution of the Reynolds equation is found at various points along the length and circumference of the bearing, the center of pressure can be found be calculating the axial centroidal center of the known pressure profile. Using this calculated effective center of pressure, the bending model is reevaluated and a new slope through the bearing 11 can be calculated. The calculation process is iterated until a solution of the rotor bending model and the hydrodynamic center of pressure are coincident. The actual film thickness at any point in the journal can now be calculated. The minimum thickness will be at the inner edge of the journal adjacent to the rotor face 27.

To compensate for the bending problem, the bore of bearing 11 can be contoured any given amount over a selected portion of the bearing length to match the rotor bending and provide an acceptable, or desirable, minimum film thickness. Such a configuration is shown in FIG. 4.

Referring to FIG. 4, the babbitt 13 has been contoured uniformly and linearly over the right half of its length 28 such that the bearing bore matches the rotor bending line over one half its length, that is the angle of the contour 28 relative to the bearing shell 12 is substantially equal to the bending angle 19 of the rotor 10. The contour 28 may extend over a reasonable range such as ¼ of the bearing length L to the full length L. A uniform straight line contour has been found to be satisfactory such that the increase in bearing clearance changed linearly according to the relationship:

$$C = 2bx + Cl$$

where:
  b = desired contour
  C = bearing diametral clearance
  Cl = nominal diametral clearance at start of contour
  x = axial distance from start of contour While FIG. 3 shows a straight line contour of the babbitt 13, the invention is not limited to a straight line contour. While other geometric shapes such as an elliptically varying surface along the axial length of the bearing may be employed, the straight line contour was used because of the relative ease of manufacture.

The benefits realized by the contoured bearing of FIG. 3 as compared with the conventional bearing of FIG. 2 are illustrated, by way of example, in the table of FIG. 5 which illustrates two representative designs to demonstrate benefits resulting from bearing contouring in accordance with the present invention. Referring to FIG. 5, journal slopes of 0.00 inch/inch and 0.004 inch/inch are shown. The first example or column describes a bearing with 0.000 inch/inch journal slope, that its the bearing of FIG. 2. The second and third examples or columns describe a contoured bearing of the type shown in FIG. 3. In all 3 cases, the journal speed (1000 RPM), journal load (50,000 pounds) journal diameter (12.00 inches), bearing diametral clearance (0.012 inches), and journal length (10.00 inches) are the same. However, in Example 1 it can be seen that for a rotor journal slope of 0.00 inches/inch, that is no bending of the rotor, the minimum film thickness is 1.579 mils which is acceptable. However, with a rotor journal slope of 0.004 inches/inch the minimum film thickness falls to an undesirable 0.115 mils. This is to be contrasted with the contour bored bearing in accordance with the present invention, where in example 2, with a contour slope of 0.004 inches/inch for 6.00 out of the 10.00 inches of the journal, the minimum film thickness is 1.036 mils for 0.000 inches/inch of rotor journal slope, that is no bending, a very acceptable amount; and a minimum film thickness of 1.223 mils for a rotor journal slope of 0.004 inches/inch. The latter is to be compared with the 0.115 mils minimum film thickness in the straight bored bearing of Example 1. The improvement is better than 10 to 1. In example 3, where the 0.004 inches/inch contour slope is for all 10.00 inches of the bearing journal length, the minimum film thickness is only 0.070 inches for the no bending rotor journal slope of 0.00 inches/inch, but is 1.282 mils for a rotor journal slope of 0.004 inches/inch.

Table 1 points out that the straight bored bearing of Example 1 has an unacceptable film thickness when subjected to a journal slope of 0.004 in/in. However, the contour bored bearing, both the 6.00 inch contour of Example 1 and the full 10.00 contour of Example 2 are acceptable, with a minimum film thickness in excess of 1 mil.

In the 0.00 in/in rotor journal slope condition, the straight bored bearing develops the greatest film thickness, as anticipated, with the 60 per cent contouring of Example 2 showing some degradation in performance, and the full contour bored bearing of Example 3 being an unacceptable design with considerably less than 1 mil minimum film thickness.

Thus the 60 per cent contour is inherently more versatile in achieving adequate film thickness over a variety of load ranges and is more tolerant to installation errors which might result in errors in journal slope. Approximately 50 per cent contour may be even more versatile in achieving adequate film thickness over a variety of load ranges such as are encountered in marine propulsion gearing. On the other hand, the full contour is better suited for industrial applications where speed and load are typically maintained at full rated value.

The final determination of the amount and length of contour for a particular application is primarily dependent on a detailed evaluation of the operating profile as it affects bearing film characteristics as well as manufacturing tolerances and supporting structure design. There appears to be no practical upper limit on the amount of contour that can be machined into the bearing bore, and in this case the bending stress on the shaft would become the limiting factor. Similarly there is no lower limit on the amount of contouring required in that small values suggest that a straight bored bearing would most likely be adequate to develop the necessary minimum film thickness.

While the present invention has been described with respect to certain preferred embodiments thereof, it is to be understood that numerous variations in the details of construction, the arrangement and combination of parts, and the type of material used made be made without departing from the spirit and scope of the invention.

What I claim is:

1. An improved journal bearing adapted for use in lubricated gear trains under loads sufficient to bend the rotor which is rotatably supported within said bearing comprising:
    a bearing shell;
    a non-resilient babbitt lining supported within said bearing shell and interposed between said bearing shell and said rotor;
    the external surface of said lining being of uniform diameter and in contact with said bearing shell to prevent movement of said lining within said bearing shell;
    a portion of the internal surface of said babbitt lining being contoured under no load in a direction along the axis of said rotor and said bearing to conform more closely to the contour of said rotor under load;
    the slope and length of said contour being adequate to maintain an acceptable minimum lubrication film thickness of said bearing with said rotor over the load profile of said rotor.

2. The journal bearing of claim 1 wherein said portion of said babbitt lining being adjacent to the portion of said rotor which is subjected to said load with the minimum thickness being immediately adjacent said portion of said rotor.

3. The journal bearing, of claim 2 wherein said portion of said babbitt comprises approximately half of the axial length of said babbitt.

4. The journal bearing of claim 3 wherein said minimum film thickness is maintained in excess of one half mil.

5. The journal bearing of claim 4 wherein said contour is a straight line along the axial length of said bearing.

6. The journal bearing of claim 4 wherein the slope of said contour of said babbitt is approximately 0.004 inches per inch.

7. The journal bearing of claim 2 adapted for use in gear trains generally run at full load wherein said portion of said babbitt is substantially the whole axial length of said bearing.

8. The journal bearing of claim 1 wherein the slope of said contour relative to said bearing shell is substantially equal to the bending angle of said rotor.

9. The journal bearing of claim 1 wherein said contour is determined by determining the slope of the journal portion of said rotor within said bearing and the oil film thickness is calculated through a finite difference solution of the Reynolds equation.

* * * * *